United States Patent
Van Driest et al.

(10) Patent No.: US 8,531,981 B2
(45) Date of Patent: Sep. 10, 2013

(54) ARRANGEMENT FOR DETERMINING A CHARACTERISTIC FORM OF AN INPUT SIGNAL

(75) Inventors: Hans Van Driest, Den Haag (NL); Wessel Harm Lubberhuizen, Delden (NL)

(73) Assignee: Greenpeak Technologies B.V. (NL)

( * ) Notice: Subject to any disclaimer, the term of this patent is extended or adjusted under 35 U.S.C. 154(b) by 465 days.

(21) Appl. No.: 12/863,395

(22) PCT Filed: Jan. 25, 2008

(86) PCT No.: PCT/NL2008/050047
§ 371 (c)(1), (2), (4) Date: Jul. 16, 2010

(87) PCT Pub. No.: WO2009/093892
PCT Pub. Date: Jul. 30, 2009

(65) Prior Publication Data
US 2011/0051612 A1    Mar. 3, 2011

(51) Int. Cl.
*H04J 1/16* (2006.01)
*H04L 7/00* (2006.01)
(52) U.S. Cl.
USPC .......................................... 370/252; 375/365
(58) Field of Classification Search
USPC .................. 370/204, 207, 208, 252
See application file for complete search history.

(56) References Cited

U.S. PATENT DOCUMENTS

| 6,058,150 | A | 5/2000 | Ghosh | |
|---|---|---|---|---|
| 7,839,923 | B2 * | 11/2010 | Wang et al. | 375/233 |

FOREIGN PATENT DOCUMENTS

WO    WO2004088901    10/2004

OTHER PUBLICATIONS

International Search Report in re: PCT/NL2008/050047 dated Dec. 11, 2008, 2 pages.

* cited by examiner

*Primary Examiner* — Ian N Moore
*Assistant Examiner* — Afshawn Towfighi
(74) *Attorney, Agent, or Firm* — Fliesler Meyer LLP

(57) ABSTRACT

A receiver and method for determining a characteristic from an input signal is disclosed. A characteristic is at least one selected from a group comprising preamble detect, frequency offset and timing offset. The input signal comprises an IF frequency fIF and a preamble signal which is a sequence of M similar data symbols. The data symbols have a symbol period SP, and M is an integer greater than or equal to 2. The method comprises: —receiving N subsequent samples of the input signal, the N subsequent samples representing a part of the input signal approximating the symbol period SP, —rotating N subsequent samples to obtain N rotated symbols; —correlating the N rotated symbols with P correlation functions to generate a set of N×P correlation values, P being an integer greater than or equal to 2; and, —selecting a maximum correlation value from the set of N×P correlation values and determining the characteristic. The invention enables to perform an efficient antenna diversity circuit, which can be used for simultaneously timing offset and frequency offset estimation, and preamble detection for both antennae with only one radio unit.

15 Claims, 7 Drawing Sheets

| corr.nr | mult.Fs | IF freq. |
|---|---|---|
| 1 | 28.5 | 1781.25 |
| 2 | 29.0 | 1812.50 |
| 3 | 29.5 | 1843.75 |
| 4 | 30.0 | 1875.00 |
| 5 | 30.5 | 1906.25 |
| 6 | 31.0 | 1937.50 |
| 7 | 31.5 | 1968.75 |
| 8 | 32.0 | 2000.00 |
| 9 | 32.5 | 2031.25 |
| 10 | 33.0 | 2062.50 |
| 11 | 33.5 | 2093.75 |
| 12 | 34.0 | 2125.00 |
| 13 | 34.5 | 2156.25 |
| 14 | 35.0 | 2187.50 |
| 15 | 35.5 | 2218.75 |

|   | correlator number | | | | | | | | | | | | | | | | | | | | | | | |
|---|---|---|---|---|---|---|---|---|---|---|---|---|---|---|---|---|---|---|---|---|---|---|---|---|
| 1 | 0 | 1 | 1 | 0 | 1 | 1 | 1 | 1 | 1 | 0 | 1 | 1 | 0 | 1 | 1 | 2 | 2 | 2 | 2 | 2 | 2 | 3 | 3 | 1 | 1 |
| 2 | 3 | 3 | 1 | 1 | 0 | 1 | 1 | 1 | 1 | 0 | 1 | 1 | 1 | 1 | 1 | 0 | 0 | 1 | 2 | 2 | 2 | 2 | 2 | 2 |
| 3 | 2 | 1 | 1 | 0 | 0 | 1 | 1 | 2 | 2 | 3 | 3 | 0 | 1 | 3 | 3 | 4 | 4 | 3 | 3 | 1 | 2 | 2 | 2 | 2 | 3 |
| 4 | 1 | 1 | 1 | 1 | 0 | 1 | 1 | 2 | 2 | 2 | 2 | 1 | 1 | 3 | 3 | 4 | 4 | 2 | 2 | 1 | 0 | 0 | 2 | 2 | 2 |
| 5 | 2 | 2 | 3 | 3 | 3 | 3 | 3 | 3 | 3 | 3 | 1 | 2 | 2 | 2 | 2 | 2 | 2 | 1 | 1 | 0 | 0 | 0 | 0 | 0 | 0 |
| 6 | 2 | 2 | 2 | 3 | 3 | 2 | 3 | 3 | 2 | 2 | 2 | 2 | 2 | 1 | 0 | 0 | 0 | 2 | 2 | 3 | 3 | 0 | 1 | 1 | 2 |
| 7 | 1 | 1 | 1 | 2 | 2 | 2 | 2 | 1 | 1 | 2 | 2 | 3 | 4 | 3 | 2 | 2 | 1 | 0 | 1 | 2 | 2 | 2 | 1 | 1 | 2 |
| 8 | 1 | 1 | 2 | 2 | 1 | 1 | 3 | 3 | 7 | 7 | 11 | 11 | 9 | 9 | 5 | 5 | 0 | 1 | 1 | 2 | 2 | 3 | 3 | 4 | 4 |
| 9 | 4 | 2 | 2 | 2 | 2 | 1 | 4 | 4 | 9 | 9 | 12 | 12 | 9 | 9 | 4 | 4 | 0 | 0 | 1 | 1 | 2 | 2 | 2 | 2 |
| 10 | 1 | 2 | 2 | 1 | 1 | 1 | 0 | 1 | 2 | 3 | 4 | 3 | 3 | 3 | 1 | 1 | 1 | 2 | 2 | 1 | 1 | 1 | 1 | 1 | 1 |
| 11 | 1 | 3 | 3 | 2 | 2 | 1 | 2 | 2 | 2 | 2 | 3 | 3 | 3 | 3 | 3 | 3 | 4 | 4 | 3 | 3 | 2 | 2 | 1 | 1 |
| 12 | 1 | 1 | 1 | 1 | 1 | 1 | 1 | 1 | 1 | 2 | 2 | 1 | 1 | 2 | 2 | 2 | 2 | 2 | 2 | 3 | 3 | 3 | 3 | 1 | 1 |
| 13 | 1 | 1 | 0 | 1 | 1 | 2 | 2 | 2 | 2 | 1 | 1 | 1 | 1 | 3 | 3 | 2 | 2 | 2 | 1 | 1 | 1 | 1 | 1 | 0 | 1 |
| 14 | 0 | 0 | 0 | 2 | 2 | 1 | 1 | 2 | 2 | 0 | 1 | 1 | 1 | 2 | 2 | 2 | 2 | 0 | 1 | 1 | 1 | 1 | 1 | 1 | 1 |
| 15 | 1 | 1 | 1 | 1 | 1 | 2 | 2 | 2 | 2 | 1 | 1 | 1 | 1 | 0 | 0 | 0 | 0 | 0 | 0 | 1 | 2 | 2 | 3 | 3 | 3 |

*nr. of shifts*

Fig 14

ARRANGEMENT FOR DETERMINING A CHARACTERISTIC FORM OF AN INPUT SIGNAL

FIELD OF THE INVENTION

The present invention relates to an arrangement for determining a characteristic from an input signal. In a further aspect the invention relates to a receiver for estimating a timing offset and frequency offset. In a further aspect, the present invention relates to a method for estimating a timing offset and frequency offset. In yet a further aspect, the present invention relates to a method for preamble detection and antenna diversity selection.

The invention has particular application in wireless infrastructure employing wireless communication devices in which power consumption of the whole infrastructure or power consumption of a battery powered device is an issue. ZigBee, Bluetooth and IEEE 802.11 ("WiFi") are examples of wireless protocols that could be used.

PRIOR ART

Such a receiver is known to be used in a low data rate wireless communication network, e.g. operating according to the ZigBee standard (using the IEEE 802.15.4 Medium Access Control and Physical Layer Specifications). The network may be used as a low power wireless sensor or control network, and e.g. applied in home automation, lighting and security, heating, ventilation and air-conditioning systems or industrial automation. These kinds of applications require sensor and control nodes in the network which can be battery operated.

However in low power systems there are premiums and often limitations on resources, and any design must be compromised between the need for optimizing the performance and available resources.

Particularly in very low power systems where energy consumption is a premium and may well be supplied for energy recycling or energy scavenging techniques the demands are very heavily biased in respect of the need for frugality.

Typically an RF networking system will allow a period of training symbols to be transmitted prior to any payload of data so that the intended receiver may identify the upcoming packet and make any adjustments needed in order to minimize the error rate.

This period of training symbols, such as a preamble, is a system overhead and has no other relevance and in itself requires energy to be expended, so must be held to an absolute minimum length in low power systems. A short period of training symbols is in conflict with need for features such as antenna diversity.

Any circuitry designed to perform the needed actions, has on one side to be very economic with energy and so has to be limited in gate count and circuit complexity, but has to perform the operation in a very short time space and with a high degree of accuracy to achieve the maximum performance.

ZigBee/IEEE 802.15.4 is used as an example of a low power networking system where very low power techniques are required to achieve the optimal performance, but the IEEE 802.15.4 Physical Layer Specifications have not be defined with antenna diversity in mind.

In a radio link in for example a low data rate wireless communication network a part of the attenuation of a signal received at an antenna is caused by multipath fading. The signal from a transmitter is not reaching the antenna by one single signal path, but by a number of signal paths. The signals reaching the antenna by different signal path can have such a phase difference that the sum of the signals is less than one of the signals alone. The use of two or more antennae can reduce this attenuation significantly, by optimum combining or phase weighted addition of the two or more antennae. A more simple method for using two or more antennas is selecting the antenna with the best signal. The best signal can be defined in several ways; absolute level and signal to noise or interference ratio are two commonly known selection criteria. With multipath fading conditions a link budget improvement of 10 dB can be expected from a two antennae system with an antenna diversity circuit. The advantages of antenna diversity are described in more detail in: Microwave Mobile Communication by William C. Jakes, chapter 6, Diversity techniques. ISBN 0-7803-1069-1.

Antenna diversity is based on the evaluation of the signal received at the two or more antennae. This evaluation has to take place on a training or preamble signal of a data message. If a receiver comprises only one receiving circuit the evaluation of the antenna signals could to be done one by one. This requires a longer preamble than would be needed if only one antenna is used to detect the preamble. The preamble is a portion of the transmitted packet that does not contain payload information, and is used for synchronization purposes. For optimum bandwidth utilization this "overhead" has to be as small as possible. Furthermore, in a low power network system such as ZigBee, the packet or data message transmitted should comprise as few "overhead" as possible. In the IEEE 802.15.4 standard, the preamble is 8 symbols long, which is short for an antenna diversity system.

A transmission signal according to the 802.15.4 standard is based on Minimum-Shift Keying (MSK) or Offset Quadrature Phase-Shift Keying (OQPSK) with half-sinusoidal pulses. MSK is a digital modulation scheme that conveys data by altering the carrier frequency. An MSK signal can be thought as a special form of OQPSK where the base band rectangular pulses are replaced with half-sinusoidal pulses. See Wireless communications—Principles and practice, T. S. Rappaport, Prentice Hall PTR 1996, ISBN 0-13-375536-3, p. 259.

An IEEE 802.15.4 packet starts with a synchronization header SHR. The SHR comprises a preamble sequence and a start of frame delimiter SFD. The preamble sequence is a sequence of 8 similar data symbols. A data symbol is mapped into a continuous string of 32 pseudo noise (PN) code elements also called "chips". The IEEE 802.15.4 distinguishes 16 difference data symbols, wherein each data symbol is mapped into a unique 32-chip PN sequence. The 16 PN sequences are related to each other through cyclic shifts and/or conjugation (i.e. inversions of odd-indexed chip values). In this way a data symbol comprises 4 bits corresponding to 1 out of the 16 different PN sequences.

The single codeword of 32 chips and its shifted and/or conjugated versions have good (peak) correlation properties with respect to the matching codeword within (silelobe) correlation to the non-matching shifted/inverted codeword. During the transmission of the preamble sequence, a codeword sequence related to data symbol 0000 ("0") is used 8 times. The SFD comprises subsequently a codeword sequence related to data symbol "1110 ("7") and 0101 ("10") respectively.

In general, the preamble detection should be sufficiently reliable and not dominate the failure of received packets. In other words, most packets should fail on data errors, not because a preamble is not detected. Also, the estimation of frequency offset and symbol timing should be good enough and not be a dominant cause of data errors.

In a direct sequence spread spectrum system (with a fixed spreading sequence), a reliable method for preamble detection is to find the correlation between the known spreading sequence and the received signal. The IEEE 802.15.4 preamble consists of 8 identical preamble symbols as mentioned above. To be able to detect the 802.15.4 preamble we can measure the correlation over a single symbol interval. However, a single correlation result does not give a reliable distinction between a noise signal and a preamble signal in presence of noise (poor SNR). By averaging over a number of correlation results the distance between noise and a noisy preamble will increase to a sufficiently reliable level. Next, the averaged result is compared with a threshold and when this threshold is exceeded, a preamble is detected (assumed to be present).

Furthermore, the correlation over a single symbol interval can be affected due to a larger frequency offset and a larger symbol interval duration. Therefore, in some cases the frequency offset should be compensated in advance to allow a system to detect a preamble.

When we want to use more antennas, the above operation must be performed separately for each antenna. The above method is in itself straight forward. The most direct way to evaluate the signal of more than one antenna is to use as many receivers as there are antennae. However, this would be expensive in terms of chip area and in power consumption. Therefore, it is preferred to use a single radio circuit to evaluate the signal from all antennae.

A conventional way of using one radio system with antenna diversity, is to do a complete detection (and possibly a complete training) on the signal from one antenna, and then do the same on the signal from other antenna. Once a preamble is detected, the signal on the other antenna is evaluated, to determine which of the antennae provides the signal with the best signal quality.

Figure 2:
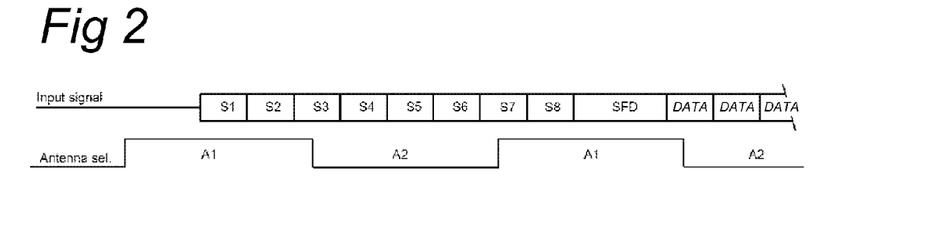
FIG. 2 illustrates a conventional way of processing a signal from two antennae with a one receiver.

FIG. 2 shows an example of a conventional way of evaluating the signal of two antennae with a single radio system. The inputs signal consists of a preamble with 8 identical preamble symbols S1-S8 (each with the same code sequence or waveform), followed by a start of frame delimiter SFD and payload data.

The signal received with one antenna is observed long enough, to be able to detect preamble and obtain a frequency offset and symbol timing estimation. It is assumed that at least three correlation results are needed for reliable preamble detection. In FIGS. 2, A1 and A2 refer to the period wherein the first and second antenna signal is selected respectively.

Initially the receiver is not synchronized with the input signal, i.e. the symbol timing is not known. Therefore, the antenna switching is not synchronized with the symbol boundaries. Hence an antenna 'slot', i.e. the period an antenna is selected, must have a duration length of at least four symbol intervals to guarantee three complete correlation results.

Furthermore, there is no synchronization between antenna switching and the start of the preamble. Therefore the preamble could start in the middle of an antenna slot. Referring to FIG. 2, lets assume that only antenna 1 delivers signal of sufficient quality to detect a preamble.

During the first antenna slot, the preamble is not detected because during only a portion of this slot the preamble signal is present. Consequently, the start of the preamble is missed, since there is insufficient time to detect the preamble. The next slot does not result in preamble detection either, since antenna 2 does not deliver signal of sufficient quality. Thus, preamble detection could only take place in the slot starting half away the reception of symbol 7. In this slot only the last of the eight preamble symbols will be detected as preamble symbol and provide a complete correlation result. The two SFD symbols which are different from preamble symbols, will not be recognized as preamble symbol, and do not provide correlation results for reliable preamble detection. Even when the preamble was detected, it would be needed to evaluate antenna 2 again with the estimated timing, to compare the quality of the signal received on both antennae. The last one is needed, since it is not known when the preamble started and therefore it is not known if the signal is already present during the previous slot of antenna 2.

Figure 3:
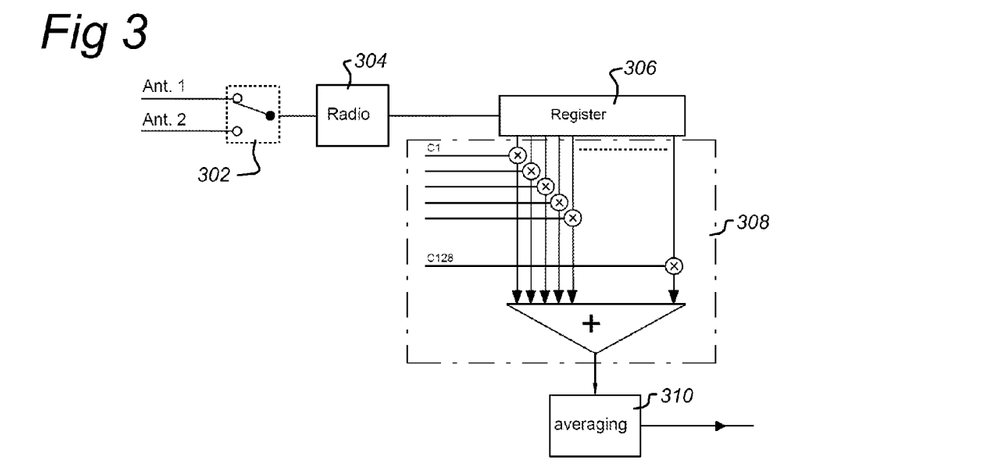
FIG. 3 shows a simplified block diagram of an implementation for evaluating an antenna signal.

FIG. 3 shows a possible realization that could be used for the method described above. A correlator is implemented as finite impulse response (FIR) filter. The radio, correlator and averaging circuit are used to evaluate the signals from both antennae successively.

Another method for evaluating signal from two antennae would be to switch faster between antennae and evaluate both antennae in a pseudo parallel way. A practical minimum period for antenna switching is the symbol interval. However, a period corresponding to the symbol interval would allow to obtain a single correlation result only when said period captures a symbol from its beginning to its end. A problem here is that the symbol timing is not yet known, which means that generally in one symbol interval the last part of a symbol is captured and the beginning of the subsequent symbol. Therefore, a antenna selection signal which selectively selects one of the antennas for at least two symbol interval is needed to ensure that at least one complete correlation result will be generated.

Figure 4:
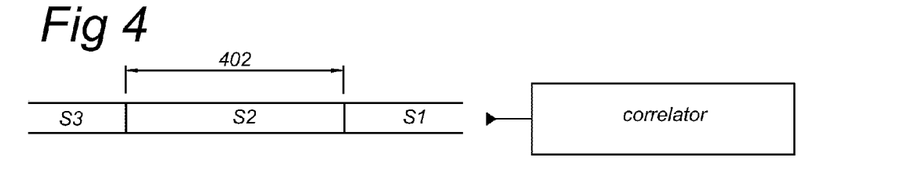
FIG. 4 illustrates in more detail the processing by the implementation shown in FIG. 3.

FIG. 4 shows how input samples that are shifted into a correlator during two symbol intervals. At first, the samples during one symbol interval period are needed to fill the register to perform the correlation function. Then, each next sample of the second symbol interval is shifted into the register and a correlation is performed on the content of the register to find a correlation maximum.

A period of two symbol intervals for antenna switching would deliver not more than 4 correlation results over the length of the preamble, two for each antenna. This is insufficient for averaging over at least three correlation results for each antenna.

SUMMARY OF THE INVENTION

The present invention seeks to provide an improved arrangement and method for determining a characteristic from an input signal and an improved method for preamble detection in presence of a frequency offset. The characteristic is at least one selected from a group comprising preamble detect. The input signal comprising an IF frequency $f_{IF}$ and a preamble signal being a sequence of M similar data symbols, the data symbols having a symbol period SP, M being an integer greater than or equal to 2.

According to the present invention, the arrangement comprises:

an input terminal for receiving N subsequent samples of the input signal, the N subsequent samples representing a part of the input signal approximating the symbol period SP, a rotation unit for the rotating N subsequent samples to obtain N rotated symbols;

a correlation unit for correlating the N rotated symbols with P correlation functions to generate a set of N×P correlation values, each correlation function having a different centre frequency and P being an integer greater than or equal to 2; and, a processing unit for selecting a maximum correlation value from the set of N×P correlation values and determining the characteristic.

The invention is based on the following recognition. IEEE 802.15.4 uses a modulation scheme in which the data is mapped into symbols based on four bits. Each symbol is defined by a unique code of 32 chips or elements. The symbol rate is 62.5 kHz (period 16 usec), giving a chip rate of 62.5 kHz×32=2 MHz. In an embodiment described below, a sample rate of 8 MHz is used. A preamble consists of an eight times repetition of the same symbol. Whatever the timing of a selection period corresponding to the symbol period, always seven times a register could be filled with a similar signal. The register comprises generally the last part of a symbol and the beginning part of the subsequent symbol. As the subsequent symbols of the preamble are similar, the beginning part the subsequent symbol is similar to the beginning of the previous symbol. Thus, the register comprises the content of a symbol but in a cyclic shifted version. By rotating the content of the register and performing a correlation on the cyclic shifted version, the timing offset can be estimated. The number of required shifts to find the best correlation is a measure of the timing offset. Furthermore, if the correlation value exceeds a predetermined value, this is an indication that the content of the register matches a preamble symbol. The use of a number of correlators in parallel, that are each matched to a different centre frequency, allows us to obtain a frequency offset estimation and to recognize the presence of preamble symbols. A correlators will provide a correlation value above a predetermined value if the input of the shift register shows similarity with a preamble symbol. Therefore, the correlator providing a high correlation value indicates simultaneously the presence of a preamble symbol and the corresponding frequency offset. In this way, a preamble detection can be made in presence of larger frequency offsets without compensating the frequency offset in advance. The centre frequency corresponding to the correlator providing the best correlation value provides a measure to estimate the frequency offset.

In a further embodiment, the processing unit is arranged to estimate from Q subsequent sets of N×P correlation values related to both the frequency offset and timing offset, Q being an integer greater than 2 and smaller than M. In a more specific embodiment, the processing unit is arranged to generate a preamble detection signal when the sum of the maximum correlation value from Q subsequent sets of N×P correlation values exceeds a predefined preamble detect threshold and the variance between frequency offsets and timing offsets estimated from said Q subsequent sets of N×P correlation values is within predefined limits, Q being an integer greater than 2 and smaller than M.

By means of the method according to the invention, from one preamble seven correlation values can be determined. In case of an antenna diversity system with two antennae and having a switching period approximating the symbol period, for one antenna four correlation values can be determined and for the other antenna three correlation values can be determined. Thus, when only one antenna delivers a signal of sufficient quality to detect a preamble, irrespective the timing offset of the antenna switching signal, for both antennae the three correlation values enable us to determine the distance between noise and a noisy preamble with a sufficiently reliable level, to ensure a reliable preamble detection.

In a further embodiment, the rotation unit comprises:
a first multiplexer having a first input coupled to an input of the rotation unit, a second input and an output;
a first shift register comprising N delay elements, the first shift register having an input coupled to the output of the first multiplexer, a serial output coupled to the second input of the first multiplexer and a parallel output;
a first multiplexer having a first input coupled to an input of the rotation unit, a second input and an output;
a second shift register comprising N delay elements, the second shift register having an input coupled to the output of the second multiplexer, a serial output and a parallel output;
an inverter having an input coupled to the serial output of the second shift register and an output coupled to the second input of the second multiplexer;
a first output coupled to the parallel output of the first shift register; and
a second output coupled to the parallel output of the second shift register; and wherein the correlation unit comprises a first input coupled to the first output of the rotation unit and a second input coupled to the second output of the rotation unit, the rotation unit further comprises two types of correlators, a first type of correlators having a centre frequency for which holds:

$$f_c = f_{IF} \pm \frac{X}{SP}$$

and a second type of correlators having a centre frequency for which holds:

$$f_c = f_{IF} \pm \frac{X + 1/2}{SP}$$

wherein
$f_c$=centre frequency of correlator,
$f_{IF}$=IF frequency,
SP=symbol period and
X=an integer greater than or equal to 0,
wherein an input of the first type of correlators is coupled to the first input and an input of the second type of correlators is coupled to the second input.

With a low IF architecture, the IF frequency is still present at the input signal. Therefore, the contents of the shift register is a preamble signal subjected to the frequency offset equal to the IF frequency. Feeding the output of the shift register back to its input is only allowed if the phase rotation of the IF signal between input and output is not to large. Such a phase difference occurs when the IF of the signal is not a multiple of the symbol rate. When the IF frequency gives during the duration of a symbol interval an integer number of full phase rotations, then the given feedback gives no phase error. The choice of correlator centre frequencies, is either a multiple of the symbol rate or a multiple plus half the symbol rate. For the case the correlator centre frequencies is a multiple plus half the symbol rate, the second rotation unit is used where an sign-inverted version of the signal is feed back to the input. This inversion corresponds to a phase shift of 180 degrees, which corresponds to a phase rotation caused by an IF frequency which is an integer plus half multiple the symbol rate. These features enables us to detect a preamble signal in presence of larger frequency offsets and to estimate the frequency offset more accurately.

In an embodiment of the invention, a data symbol is a PN chip sequence wherein the chip rate approximates the IF-frequency. In a more specific embodiment, N/SP approximates $4 \times f_{IF}$. In a further embodiment, N=128 and $f_{IF}$=2 MHz. In an exemplar embodiment, the input signal is a binary signal. These embodiments allow us to provides minimum implementation solutions, with respect to chip area and power dissipation.

In a further aspect, the present invention relates to a receiver for determining a characteristic for antenna signals having a carrier frequency and carrying a preamble signal being a sequence of M similar data symbols, the data symbols having a symbol period SP, M being an integer greater than or equal to 2, the receiver comprising:

a first and second input terminals for retrieving a first and second antenna signals respectively;

a first multiplexer having a first and second input coupled to the first and second input terminal respectively, and a control signal input for retrieving a control signal, the multiplexer being arranged for selecting the first and second antenna signals one by one under control of the control signal so as to obtain a combined antenna signal;

a radio unit for converting the combined antenna signal into a digital IF signal having a sample frequency $f_{SF}$;

a first rotation unit having an input, a control signal input and an output, the input being arranged for receiving N subsequent samples of the input signal under control of the control signal, the N subsequent samples representing a part of the input signal approximating the symbol period SP, the first rotation unit being arranged for rotating the N subsequent samples to generate N rotated output signals;

a second rotation unit having an input, a control signal input and an output, the input being arranged for receiving N subsequent samples of the input signal under control of the control signal, the N subsequent samples representing a part of the input signal approximating the symbol period SP, the first rotation unit being arranged for rotating the N subsequent samples to generate N rotated output signals;

a control signal generator unit for generating a control signal which enables the multiplexer to select alternating for a period which approximates the symbol period SP the first and second antenna signal, the first rotation unit to receive from the digital IF each signal part related to the first antenna signal and the second rotation unit to receive from the digital IF each signal part related to the second antenna signal;

a correlation unit for correlating the N rotated output signals generated by the first and second rotation unit with P correlation functions to generate a first and second set of N×P correlation values, each correlation function having a different centre frequency and P being an integer greater than or equal to 2; and, a processing unit for selecting from the first and second set of N×P correlation values the characteristic, wherein the characteristic is at least one selected from a group comprising preamble detect, best antenna signal, the frequency offsets and timing offsets.

In a further embodiment of the receiver, the processing unit is arranged to estimate from more than one first and second sets of N×P correlation values, the antenna providing the signal having the best signal quality. In a more specific embodiment, the processing unit is arranged to generate a preamble detection signal when the sum of the maximum correlation value from Q subsequent first or second sets of N×P correlation values exceeds a predefined preamble detect threshold and the variance between frequency offsets and timing offsets estimated from said Q subsequent sets of N×P correlation values is within predefined limits, Q being an integer greater than 2 and smaller than M. In a further embodiment, the processing unit is further arranged to select the antenna providing the signal having the best quality from at least the last two subsequent first and second sets of N×P correlation values. In a more specific embodiment, the processing unit is further arranged to estimate the frequency offset and timing offset corresponding to the selected antenna from a matrix derived from the at least the last two subsequent sets of N×P correlation values related to the selected antenna.

Due to the fast and reliable carrier detection characteristics of the present invention under poor receiving conditions, the present invention is also very suitable for use in a system with multiple antennae. The invention allows us to provided during a period of eight symbols up to seven frequency offset and symbol timing estimations. For a system with two antennae, this will result in four estimations for one antenna and three estimations for the other antenna. This allows us to average the subsequent estimation results and to select the antenna providing the best reception of the signal.

In a further aspect, the present invention relates to a method of determining a characteristic from an input signal, the input signal comprising an IF frequency $f_{IF}$ and a preamble signal being a sequence of M similar data symbols, the data symbols having a symbol period SP, M being an integer greater than or equal to 2, the method comprising:

receiving N subsequent samples of the input signal, the N subsequent samples representing a part of the input signal approximating the symbol period SP, rotating N subsequent samples to obtain N rotated symbols;

correlating the N rotated symbols with P correlation functions to generate a set of N×P correlation values, P being an integer greater than or equal to 2; and, selecting a maximum correlation value from the set of N×P correlation values and determining the characteristic.

SHORT DESCRIPTION OF DRAWINGS

The present invention will be discussed in more detail below, using a number of exemplary embodiments, with reference to the attached drawings, in which.

DETAILED DESCRIPTION OF EXEMPLARY EMBODIMENTS

Figure 1:
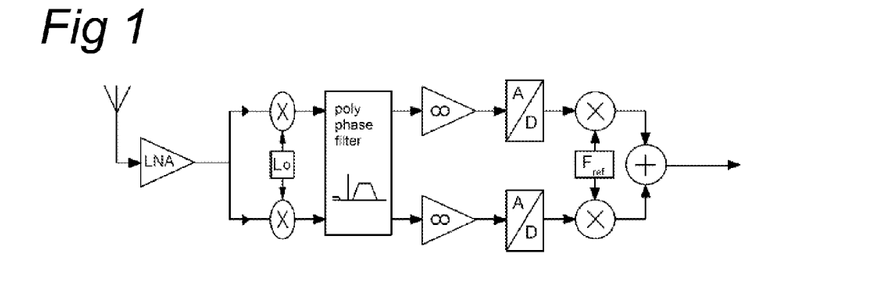
FIG. 1 shows a simplified block diagram of low IF receiver.

FIG. 1 shows a simplified block diagram of low IF receiver. The signal of the antenna is first amplified by a low noise amplifier LNA. The output of the LNA is shifted in frequency to center around the low IF frequency. In a ZigBee radio design as described here the IF frequency is 2 MHz, which has a number of advantages with regard to practical design trade-offs. Simple mixing (multiplication) of a signal with a single tone (in this case the output of the LO) results in a double spectral output. One of the signals generated by the simple mixing is centered around the desired IF, $f_{IF}$, and the other one is centered around $-f_{IF}$. In practice this means that the receiver would be not be able to distinguish between an input at $f_{LO}-f_{IF}$ and $f_{LO}+f_{IF}$. By using an LO with a complex output (in-phase and quadrature component) and mixing the input signal with these two LO outputs, we obtain a complex signal on which distinction can be made between the positive and negative spectral components. A poly-phase filter is applied on the output signals obtained by the simple mixing to suppress one of the two spectral components. The poly-phase filter is an implementation of a complex filter for band limiting and providing mirror suppression. A poly-phase filter is a filter commonly known to a skilled person.

The complex output of the polyphase filter is retained through the IF stage into the digital domain, to allow a frequency shift to remove the frequency offset. In principle, the frequency offset can be removed by changing the LO frequency, but the solution shown here is more practical as in the digital domain this function can be implemented more efficiently.

The outputs of the polyphase filter are amplified by hard limiting amplifiers and quantized by the analogue to digital converters to deliver a single bit representing the sign of the input signal of the hard limiting amplifiers. The single bit signal is multiplied with a signal having a frequency $F_{ref}$. The block $F_{ref}$ in FIG. 1 represents a complex signal generator which is to be set to minus a frequency offset value to compensate the frequency offset. The frequency offset estimation derived by the method according to the invention is used to set this frequency $F_{ref}$. Since the rest of the signal processing takes place with an IF frequency still present, only the real part of the signal is needed for further processing. In the following description the term "radio unit" refers to a low IF receiver as described above.

FIG. 3 shows a simplified block diagram of an implementation for evaluating an antenna signal. One of the antennae is selected by a multiplexer 302 and the selected antenna signal is supplied to a radio unit 304. The digital signal from the radio unit 304 is shifted into a shift register 306. The sample frequency $f_{SF}$ of the digital signal is approximately a multiple of the symbol rate and in case of a PN sequence a multiple of the chip rate. The shift register 306 has a length of delay to store a part of a signal corresponding to approximately one symbol. In the given example, the shift register 306 comprises 128 delay elements. The content of the shift register is supplied to the input of a correlator unit 308. The correlator is implemented as a finite impulse response filter (FIR) with coefficients C1 . . . C128. The correlation values is subsequently supplied to an averaging unit for averaging the correlation values of subsequent symbol intervals. When the register comprises a preamble symbol, a maximal correlation value will be generated. By generating a sequence of correlation values from the sequence of input samples, the period between peaks in the sequence of correlation values can be determined. If a peak occurs three times with an interval between the peaks corresponding to the symbol interval, the sum or average value could be determined. If the sum or average value exceeds a predetermined value, a preamble is detected and the other antenna signal will be evaluated. The position of the peaks in the sequence indicates the timing offset. The method described needs an antenna signal with duration of at least three symbol periods to detect a preamble. As the timing of the antenna switching is not in synchronization with the symbols in the antenna signal, a signal with duration of on average three and a half symbol intervals is needed and a duration of at least four symbol intervals to guarantee three 'good' correlation results. If one antenna signal is of low quality, no preamble detection will be made based on the corresponding antenna, however, the processing with other antenna signal continues independent. When the other antenna signal is of sufficient good quality, a preamble detection will be made based on the second antenna.

A more efficient method for evaluating the signals from two antennae would be to switch faster between antennae and evaluate both antennae in a pseudo parallel way. A practical minimum period for antenna switching is the symbol interval. That would allow us to obtain one correlation result, if the register comprises a symbol. However, the symbol timing is not yet known. Therefore, at least two symbol intervals are needed to ensure that at least one peak caused by a symbol occurs in the sequence of correlation values. FIG. 4 illustrates in more detail the processing by the implementation shown in FIG. 3 with switching over two symbol intervals. The left hand side shows the signal corresponding to two symbol periods of input samples that is shifted into the register and subsequently supplied to the correlator 308. Firstly, a first symbol period of samples is needed to fill the register. Then, a second symbol period of samples is needed to generate a sequence of correlation values and to determine a peak or maximum in the correlation values. Arrowed line 402 indicates the window of samples stored in the register 308 on which a correlation is performed.

A period of two symbols for antenna switching, would deliver only four correlation results over the length of an eight symbol long preamble signal. This is insufficient for averaging over at least three peak correlation results for each antenna.

The above description shows that one symbol interval is needed to fill the register enabling us to perform a correlation. The arrangement according to the invention provides a solution to determine the symbol timing from a signal from one antenna with a duration of approximately one symbol interval. According to the invention, first a register is filled with N input samples from one antenna signal and subsequently the N subsequent samples are N times rotated to obtain N rotated symbols. The N rotated symbols are supplied to the correlator to obtain the sequence of correlation values. As the preamble consists of M similar symbols having a symbol period SP, irrespective the symbol timing, the samples in the register correspond to one preamble symbol or the last part of a first preamble symbol and the beginning part of the subsequent second preamble symbol. As the preamble symbols are similar, the beginning part of the subsequent second preamble symbol is similar to the missing part of first preamble symbol. However, the register comprises the data of one complete preamble symbol. By rotating the content of the register, the timing offset of the antenna switching could be determined.

Figure 6:
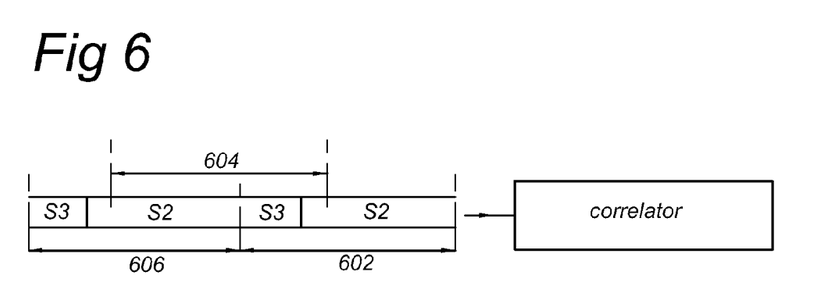
FIG. 6 illustrates in more detail the processing by the implementation shown in FIG. 5.

FIG. 6 illustrates in more detail the processing by the implementation described above. Arrowed line 602 indicates the content of the register after filling the register. In the given example, the register comprises the last part of the second preamble symbol S2 and the beginning part of the three preamble symbol S3. Subsequently, by rotation the first samples from the second preamble symbol are shifted out from the shift register and shifted in at the beginning of the shift register. Arrowed line 604 indicates the content of the register after a number of rotation and arrowed line 606 indicates the content of the register after the last rotation. A correlation maximum will be found when the content of the register matches a preamble symbol. Each rotation over a sample corresponds to a possible timing offset. With this method, one register is filled with input samples from a signal received from one antenna, while the samples stored in another register, which where obtained from another antenna during a previous antenna slot, are evaluated.

Figure 5:
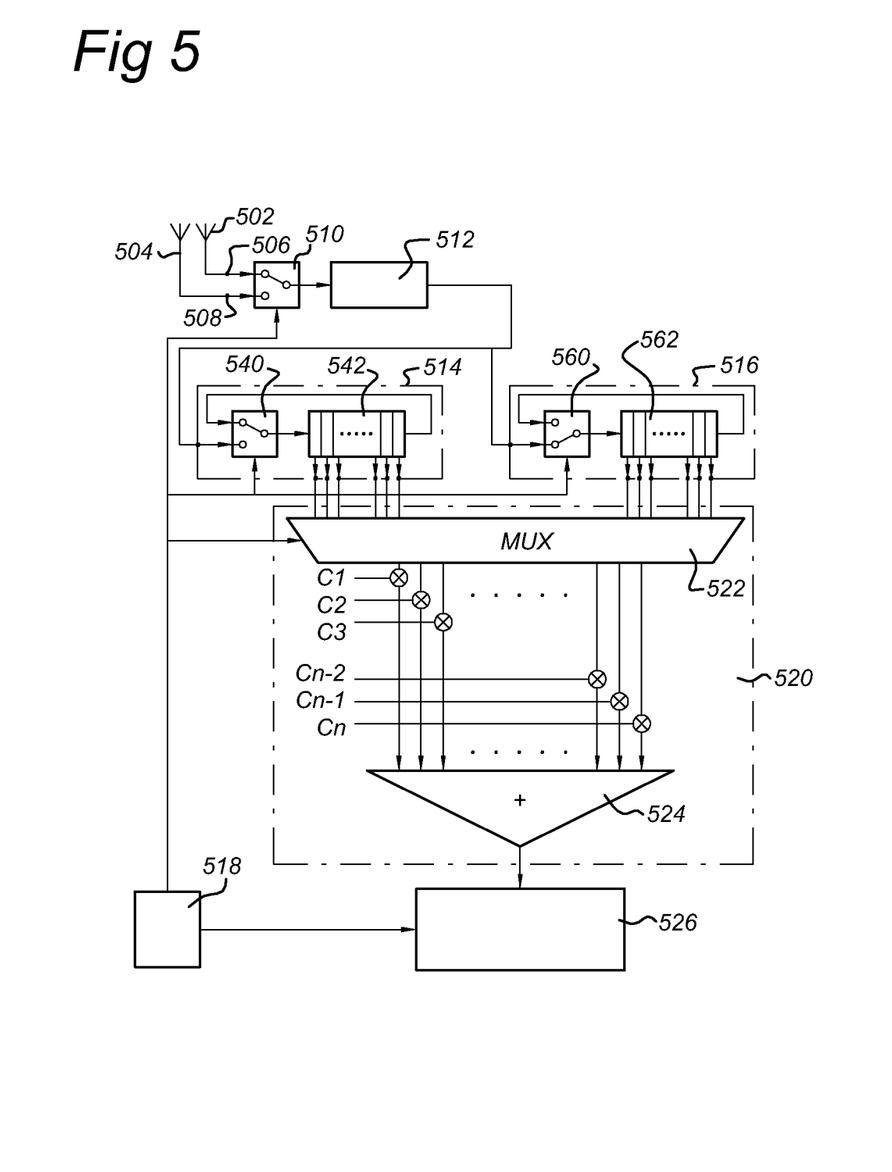
FIG. 5 shows a simplified block diagram of a first embodiment of a receiver according to the invention.

FIG. 5 shows a simplified block diagram of a first embodiment of a receiver according to the invention. The receiver comprises in this embodiment comprises a first and second input terminal 506, 508 coupled to antennae 502, 504 respectively for retrieving a first and second antenna signal. A first multiplexer 510 comprises a first and second input coupled to the first and second input terminal respectively, and a control signal input for retrieving a control signal. The multiplexer being arranged for selecting the first and second antenna signals one by one under control of the control signal so as to obtain a combined antenna signal. The combined antenna signal is supplied to a radio unit 512, as shown in FIG. 1. The radio unit 512 converts the combined antenna signal into a digital IF signal. The digital IF signal is sampled with a sample frequency $f_{SF}$. The sample frequency is preferably a multiple of the symbol rate or the chip rate in case a symbol is a PN sequence. In the present embodiment, the symbol rate is 62.5 kHz and $f_{SF}$ is 8 MHz. Accordingly, a period of a symbol is 16 μs and comprises 128 samples. A preamble symbol is a sequence of 32 chips. The chip rate corresponds to the IF frequency and is 2 MHz.

The receiver comprises a control signal generator unit 518 for generating the control signal. The control signal controls the respective units to select the desired input signals. In the present embodiment, the control signal is arranged to control the multiplexer unit 510 to select alternating for a symbol period SP the first and second antenna.

The digital IF signal comprises alternating for a symbol period an IF signal corresponding to the first and second antenna signal. The digital IF signal is supplied to a first and second rotation unit 514, 516. A rotation unit 514, 516 comprises a shift register 542, 562 and a multiplexer 540, 560. Under control of the control signal a rotation unit is arranged for receiving N subsequent samples of the input signal under control of the control signal. The N subsequent samples represent a part of the input signal approximating the symbol period SP. With a SP of 16 μs and sample frequency of 8 MHz, the shift register comprises 128 delay elements. The rotation unit is further arranged for rotating the N subsequent samples to generate N rotated output signals. In the receiver, the first and second rotation units 514, 516 are arranged such that while one rotation unit is filled with samples, the other rotation unit rotates the N subsequent samples stored in the register of the rotation unit.

While a rotation unit rotates the N subsequent samples, the content of the delay elements is supplied to a correlation unit 520 as one of the N rotated output signal. The correlation unit 520 calculates for each of the N rotated output signals a correlation value. In this way, for each timing position within a symbol interval a correlation value can be determined for the corresponding antenna signal. By the N times rotation of the N subsequent input samples, N correlation values are determined. The correlation values with the highest value determines the timing position. The correlation unit 520 comprises a multiplexer 522, N fixed multipliers and adder unit 524. The multiplexer is arranged to select shift register content of the rotation unit that is rotating the N subsequent samples. The N fixed multipliers with corresponding coefficient $C_1 \ldots C_N$ and adder unit 524 perform a correlation function on the rotated output signal and to generate an intermediate correlation value. The values for the coefficients $C_1 \ldots C_N$ can be obtained by multiplying a sequence of 128 samples corresponding to a preamble symbol with a sequence of 128 samples corresponding to an IF frequency with a predefined frequency. In the present implementation the digital IF signal is a 1 bit signal. The shift registers 542, 562 are 1-bit shift registers and the fixed multipliers can be implemented as XOR gates. Consequently, the output of the adder unit 524 is a 7 bits output value. It should be noted that the present invention is not limited to a 1 bit IF signal, 1-bit shift register and XOR gates to implement the multiplications and could also be applied to multi bit signals.

However, the IF is still present in the output signal of the adder unit 524. To enable us to process the correlator over successive symbol intervals the correlation results, the output signal of the adder unit 524 must first be converted to a magnitude like signal. Since we process only in the "real"-valued or in-phase domain, there is no magnitude of the signal available.

With an IF frequency of 2 MHz and a sample frequency of 8 MHz, the signals used are centered around 2 MHz and would show with complex-valued processing a phase change around 90 degrees per sample interval. Therefore, we can now make a magnitude estimation based on only the available real-valued or in-phase domain signals and using two correlators results with an offset of one sample interval. With the formula $|Z|=SQR(S_t^2+S_{t-1}^2)$ we get a value for the magnitude to be used for the averaging process. In the formula $S_t$ is the present intermediate correlation value obtained after t shifts or rotations, $S_{t-1}$ is the previous intermediate correlation value obtained after t−1 shifts or rotations and Z is the estimated magnitude for t shifts or rotations. This approximation for magnitude averaging is sufficient accurate for practical purposes.

In an implementation, only the 5 MSB of the output signal of the adder unit 524 are supplied to a processing unit arranged to perform the above formula. The processing unit could be part of the correlation unit 520. The processing unit comprises a delay element arranged to store the correlation value of the previous shift and a lookup table. The present correlation value and the previous correlation value are supplied to the lookup table and provides at its output the correlation value. In an embodiment, a correlation value is a 4 bits wide value. It should be clear that instead of a lookup table any other implementation of a multiplication could be used. During one symbol period the correlation unit 524 generates a set of N correlation values.

The set N correlation values are supplied to a processing unit 526 for selecting a maximum correlation value from the set of N correlation values and determining the corresponding timing offset of the control signal.

Figure 7:
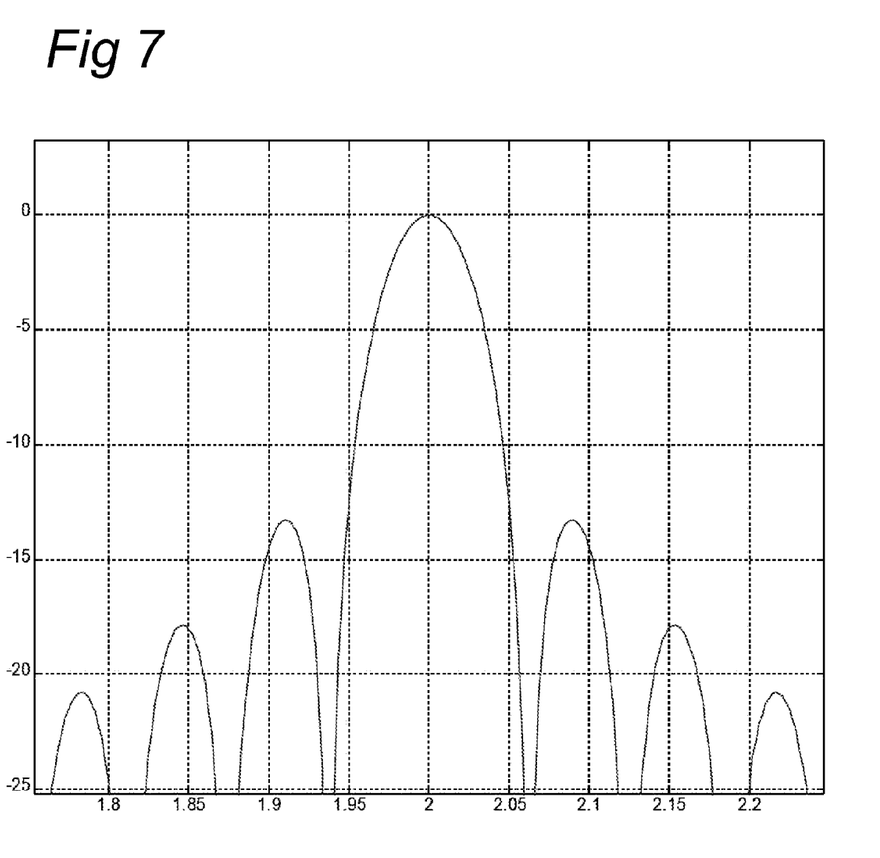
FIG. 7 shows a frequency response of a correlator based on the frequency offset that is present between the actual received preamble signal and the reference preamble, as shown in FIG. 6.

With a low IF architecture, an IF frequency is still present at the input signal of the correlator, i.e. in the N subsequent samples and its rotated versions. The input signal is a preamble signal subjected to an IF frequency. The difference between the actual received centre frequency and a reference frequency defines the frequency offset. This offset is present in the actual IF frequency as present in the received signal and the reference IF frequency. FIG. 7 shows the frequency response of a correlator as a function of the offset between its centre frequency and the IF frequency of the actual received IF signal. The vertical axis shows the level in dB and the horizontal axis shows the IF frequency of the actual received IF signal in MHz. The first zero for the offset from the centre frequency is at 62.5 kHz, which corresponds to the symbol rate. The centre frequency is placed at the middle of the IF frequency, which is 2 MHz. In an embodiment of a receiver according to the invention the reference frequency is 2 MHz. The embodiment shown in FIG. 5 and described above will only work properly if the frequency offset is much smaller than 62.5 kHz in relation with the attenuation shown in FIG. 7 with notches every 0.0625 MHz from the centre frequency.

In practice, there will be a difference between the carrier frequency on which the information is modulated and the LO frequency that is used in the receiver to convert the received signal down to the intermediate frequency. IEEE 802.15.4 defines the accuracy of the transmitter carrier frequency to be 40 ppm. The receiver will have the same carrier frequency accuracy as the transmitter. Therefore, in a worst case situation a difference between the carrier frequency of a transmitter and the one of a receiver can go up to 80 ppm. When the highest channel number the carrier frequency of 2480 MHz is used, the maximum frequency difference could be up to 198.4 kHz.

Given the frequency offset range in the range from −198.4 to +198.4 kHz, it is clear that a single correlator with a characteristic shown in FIG. 7 is insufficient for preamble detection in worst case situations.

By using a number of correlators in parallel, that are each matched to another IF frequency, the above mentioned frequency offset range can be covered. A reasonable compromise between complexity, accuracy and coverage is the use of 15 correlators with a centre frequency distance of 31.25 kHz (0.5 times the symbol rate). In this way the 15 correlators cover a frequency offset range from −230 through +230 kHz. This range is slightly larger than the above mentioned offset based on the 80 ppm. It should be noted that 7 correlators with a centre frequency distance of 62.5 kHz (corresponding the symbol rate) could also be used. However, then the correlators cover a likewise frequency offset range but the frequency offset estimation will be less accurate.

Figure 8:
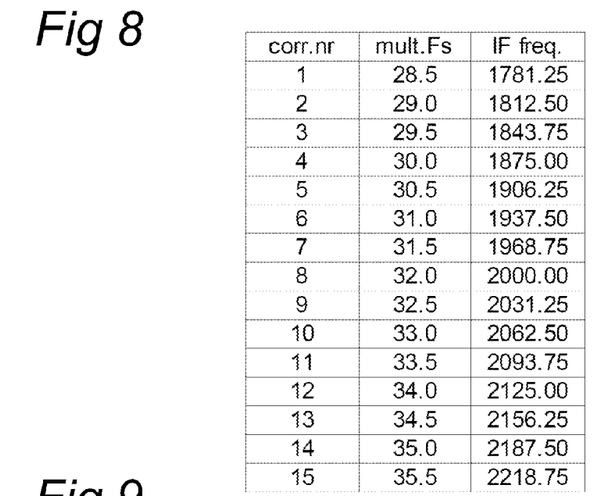
FIG. 8 shows a table with possible centre frequencies for multiple correlators.
Figure 9:
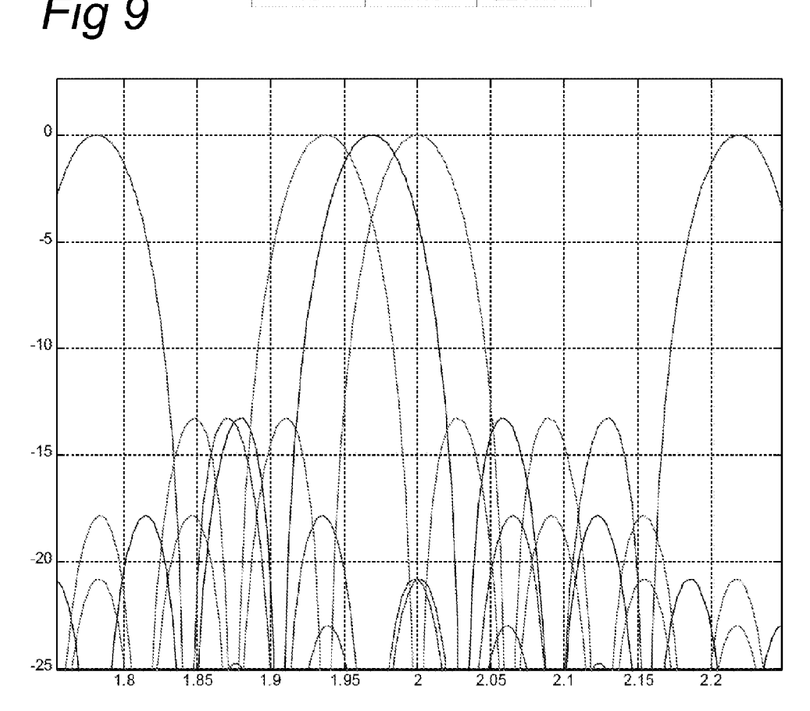
FIG. 9 shows the likewise frequency responses as shown in FIG. 7 of five correlators from the table shown in FIG. 8.

FIG. 8 shows a table with possible centre frequencies (IF frequencies) for the case wherein 15 correlators will be used with a centre frequency distance of 31.25 kHz. The value in the middle column gives the result of dividing the centre frequency by the symbol rate. FIG. 9 shows the frequency responses of five correlators from the proposed 15 correlators from the table shown in FIG. 8. The three in the middle, corresponding to the correlators in the table of FIG. 8 with number 6, 7 and 8, show how they complement each other. The two outer ones, corresponding to the correlators with number 1 and 15, indicate the frequency range that is covered.

The use of a number of correlators in parallel, that are each matched to a different centre frequency, allows the combination of preamble detection in presence of larger frequency offsets and frequency offset estimation. Which one of the correlator outputs results in the actual preamble detection, i.e. satisfy a predetermined criteria, is a qualifier for the frequency offset. A simple criterium could be that the correlation value exceeds a predetermined threshold value. Other criteria will be described below.

The receiver as shown in FIG. 5, becomes more complicated when it has to work with frequency offset. Feeding the output of the shift register back to its input, is only allowed if the phase rotation over the full length of the register is not too large. A phase difference will occurs when the IF frequency of the signal is not a multiple of the antenna switching rate, which is approximately the symbol rate. In other words, when the IF frequency gives an integer number of full phase rotations, during the duration of the signal stored in a shift register, which duration approximates a symbol interval, then the given feedback gives no phase error.

The choice of correlator centre frequencies shown in the table of FIG. 8, there is either a multiple of the symbol rate or a multiple plus half the symbol rate. The first type of correlators having a centre frequency being a multiple of the symbol rate, have an even number in said table. The second type of correlators having a centre frequency being a multiple plus a half the symbol rate, have an uneven number in said table.

The correlator unit 520 in the receiver of FIG. 5 could be arranged to have the seven correlators having the first type of correlators. However, when applying the second type of correlators, the IF frequency will give an integer plus a half phase rotations over the signal stored in the register. To avoid a discontinuity in the rotated output symbols, the samples shifted out of the register are sign inverted before the sample is fed back to the input of the shift register. This inversion corresponds to a phase shift of 180 degrees, which corresponds to the phase rotation caused by the IF frequency which is an integer multiple plus half.

Figure 10:
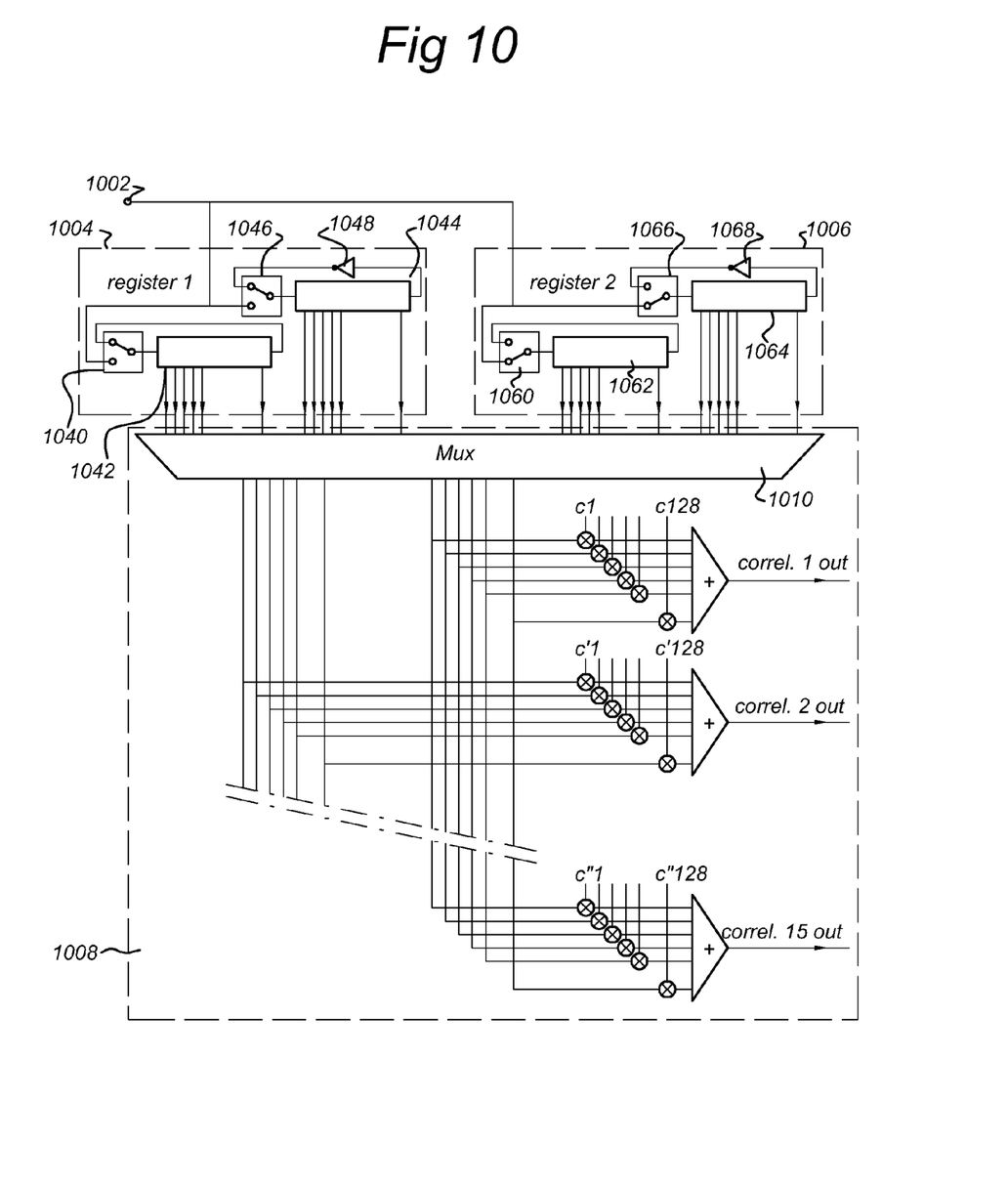
FIG. 10 shows a simplified block diagram of a second embodiment of a receiver according to the invention.

FIG. 10 shows a simplified block diagram of a second embodiment of a combination of rotation units and correlation unit as shown in FIG. 5. Input terminal 1002 is coupled to the output of a radio unit 512 as shown in FIG. 5. The input terminal 1002 receives a digital IF signal having a sample frequency $f_{SF}$. The combination shown in FIG. 10 comprises a first and a second rotation unit 1004, 1006 and a correlation unit 1008. Each rotation unit has an input, a control signal input (not shown) and an output. The input is arranged for receiving N subsequent samples of the input signal under control of the control signal. The N subsequent samples represent a part of the input signal approximating a symbol period SP. The rotation units 1004, 1006 being arranged for rotating the N subsequent samples to generate N rotated output signals. The first rotation unit 1004 is arranged to receive under control of a control signal (not shown) from the digital IF signal samples corresponding to a first antenna signal and the second rotation unit 1006 is arranged to receive under control of the control signal the samples corresponding to a second antenna signal.

Each of the rotation units 1004, 1006 comprises a first multiplexer 1040,1060 having a first input coupled to an input of the rotation unit, a second input and an output. Further, a first shift register 1042, 1062 is provided, comprising N delay elements. The first shift register having an input coupled to the output of the first multiplexer 1040, 1060, a serial output coupled to the second input of the first multiplexer and a parallel output. The rotation units 1004, 1006 further comprises a second multiplexer 1046, 1066 having a first input coupled to an input of the rotation unit, a second input and an output and a second shift register 1044, 1064 comprising N delay elements, the second shift register 1044, 1064 having an input coupled to the output of the second multiplexer, a serial output and a parallel output. The rotation units 1004, 1006 further comprises an inverter 1066 having an input coupled to the serial output of the second shift register and an output coupled to the second input of the second multiplexer. The parallel output of the first shift register and the parallel output of the second shift register provided the N rotated output signals. In the present embodiment, the N rotated output comprises two parts. A first part comprises the data provided by the first shift register 1042, 1062 and the second part comprises the data provided by the second shift register 1044, 1064.

The correlation unit 1008 comprises a multiplexer unit 1010 which is arranged to select under control of the control signal the N rotated output signal supplied by the first and second rotation unit 1004, 1006. The correlation unit 1008 comprises further P correlators. Each correlator has its own coefficients. These coefficients contain the preamble code sequence subjected to a rotation related to the IF frequency (convolution with an IF wave to provide the desired transition between first and last sample stored in the shift register). The correlators having an even number, being the first type of correlators, will be coupled to the parallel output of the first register 1042, 1062 and the correlators having an odd number will be coupled to the parallel output of the second shift register 1044, 1064. The multiplexer 1010 switches at the same moment as the other multiplexers 1040, 1046, 1060, 1066 in the diagram. In FIG. 10, the shift registers comprises 128 delay elements and the correlators comprises 128 coefficients.

With a single correlation result derived for one symbol interval the distinction between a noisy preamble signal and noise (pure noise signal) is not reliable. Averaging over multiple correlation results will improve the discrimination. Averaging over at least three subsequent symbol intervals from one antenna signal gives a reliable differentiation between noise and a noisy preamble.

Each symbol interval, with N=128 samples in an interval, gives 128 correlation results. Each rotation of the content of the shift register provides one correlation results. If more than one correlator in parallel is used, one correlation result comprises the results of each individual correlator. Averaging all 128 results over three symbol intervals would cost many gates and would consume a lot of power. The storage of the 128 correlation results of 15 parallel correlators with an accuracy of 6 bit requires a total of 128*15*6=11520 storage elements (flip flops) for each antenna. This is not practical for a low power design.

Further analysis of the sets of correlator output values over a large number of input signals has shown a property that allows simplification of the averaging process. The magnitude of a single correlation peak is not a reliable measure to distinguish between noise and a noisy preamble. However, when a preamble is present, also with a noisy preamble signal, the largest magnitude within a set of N×P correlation values points almost always to the correct timing position and correlator. In other words, the noise in a preamble signal and a preamble signal at a level that allows data reception, will almost never cause correlation peak values larger than the value corresponding to true correlation peak (position). Therefore, the averaging has only be executed for the position within a set of N×P correlation values with the largest magnitudes.

Each evaluation of a set of N×P correlator output values for a symbol interval delivers a new position in the N×P matrix having the "largest magnitude" value. Since the moment of preamble start is unknown, each new largest magnitude value could start a new averaging process position (defined by coordinates in the N×P matrix). The time index (sample number or number of shifts) and the frequency index (which one of the 15 correlators) corresponding to the largest magnitude are stored.

During the next symbol interval of the same antenna signal a new set of N×P correlation values will be generated. A first process determines the first position in the set having the largest magnitude position. This position is used as new starting point. It should be noted that in stead of the first position having the largest magnitude position the last position having the largest magnitude could be chosen. If the signal comprises only noise, the largest magnitude position could be anywhere, but when there is a preamble present, it could happen that noise will generate a peak but this will be very unlikely. Furthermore, a second process uses the position in the set of N×P correlation values corresponding to the largest magnitude position from the previous symbol interval to select from the N×P correlation values the values at the same position and to add the values to a set of values already stored for this position. For the next symbol interval, the first and second process will be repeated and a third process will use the position in the set of N×P correlation values corresponding to the largest magnitude position from the previous symbol interval to select from the N×P correlation values the values at the same position and to add the values to a set of values already stored for this position. In this way for each position found by the first process, the correlation values on said position in a set of N×P correlation values from a symbol interval and two subsequent symbol intervals are selected from the sets for further processing. The values could be summed or averaged and compared with a threshold value to determine whether said position corresponds to the timing and frequency offset of a preamble signal. In total, for each antenna, there are 3 "averaging" processes running in parallel; one just started with a history of one, one with a history of two and one with a history of three. The output of the last is compared with a threshold to evaluate whether a preamble was present.

It should be noted that in the present implementation the "averaging" process will not generate an average value of three subsequent correlation values, but the sum of the three subsequent correlation values. This can be done, as comparing an average threshold value with the "real" average of three values is equivalent to comparing three times the average threshold value with the sum of the three values.

Figure 11:
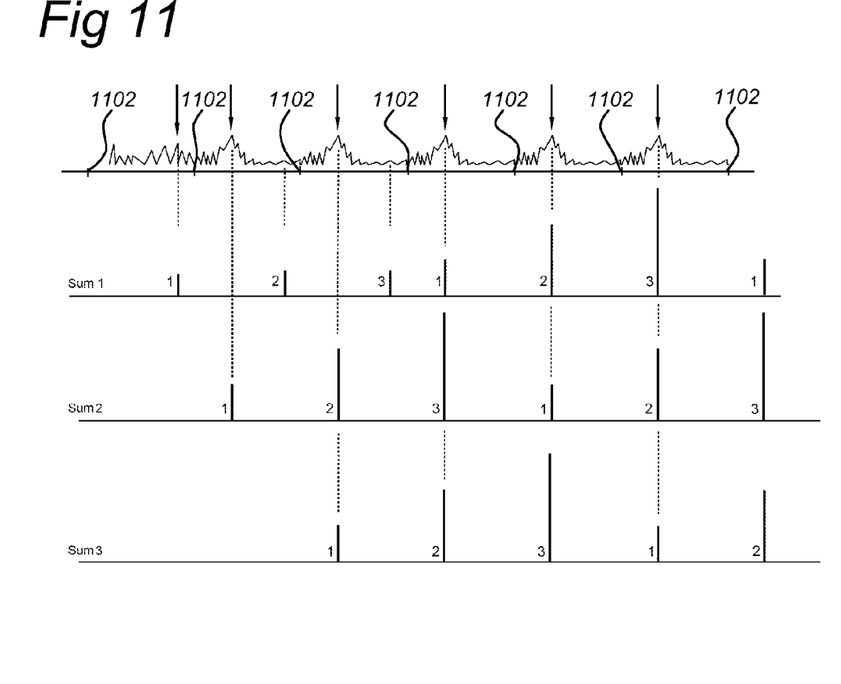
FIG. 11 shows an example of the averaging process according to the invention.

FIG. 11 shows an example of the averaging process. In this example, there is only one antenna and one correlator (P=1). The upper line depicts the magnitude of the correlator output. Reference numbers 1102 indicate the symbol interval boundaries. The arrows indicate the highest value found over a symbol interval. The lines indicated with Sum 1-3 are the outputs of the three averaging processes.

On the output of Sum 1 which is based on only noise at the input, the first averaging is based on a maximum found on noise. The result after adding three correlation results at said position is still relatively low, since with noise there is no correlation between subsequent symbols. On the output of Sum 2, the averaging process starts on the largest value that is the result of the presence of a preamble symbol. Now each next correlation value at said position in the sets with correlation values from the two subsequent symbol intervals, adds substantially to the result.

After adding three values, the result is compared with a predetermined preamble detect threshold. If the threshold is exceeded, a preamble is assumed to be present and a corresponding preamble detect signal is set.

FIG. 11 shows that with one correlator with a rotation unit according to the invention a preamble can be detected and the corresponding timing offset of the control signal controlling the antenna selection can be determined.

As described above, to be able to estimate a frequency offset, multiple correlators with different centre frequencies have to be used. When using multiple correlators a two dimensional set of N×P correlator values will be generated. The embodiment shown in FIG. 10, generates a set being a matrix of 128×15 correlation values.

Figure 12:
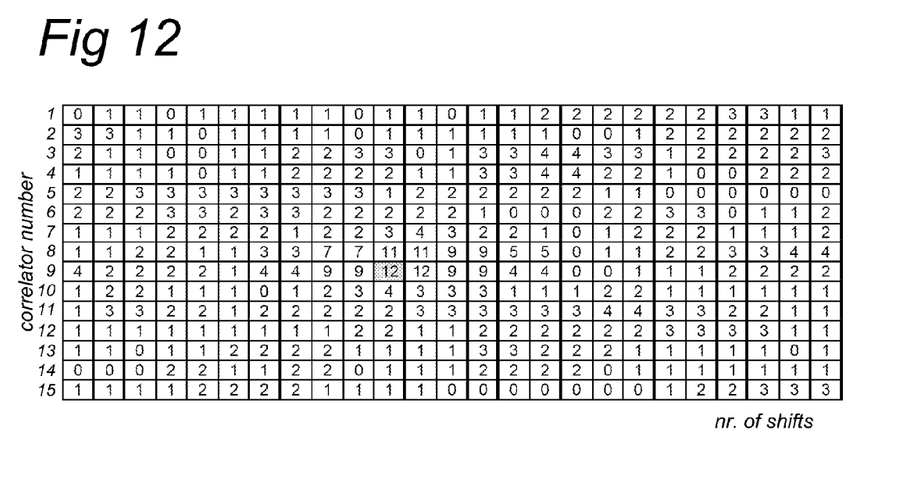
FIG. 12 shows part of a set of 128×15 correlator values.

FIG. 12 shows a part of such a matrix with dimensions 15×25. The part of the shown matrix corresponds to the output of the correlators (before averaging). The vertical position refers to one of the 15 correlators and the horizontal positions refers to a position in time or the number of cyclic shifts performed. The vertical position relates to the frequency offset encapsulated in the correlator characteristic and the horizontal position relates to the symbol timing. Matrix element with indices [9,11] gives the largest magnitude, assuming that first element in the upper left corner has indices [0,0]. The position corresponding to the largest magnitude value depends on the chosen 'largest magnitude' algorithm. In this case the first position in time and correlator number providing value '12' is assumed to correspond with the largest magnitude value. Any other algorithm would provide similar results.

Figure 13:
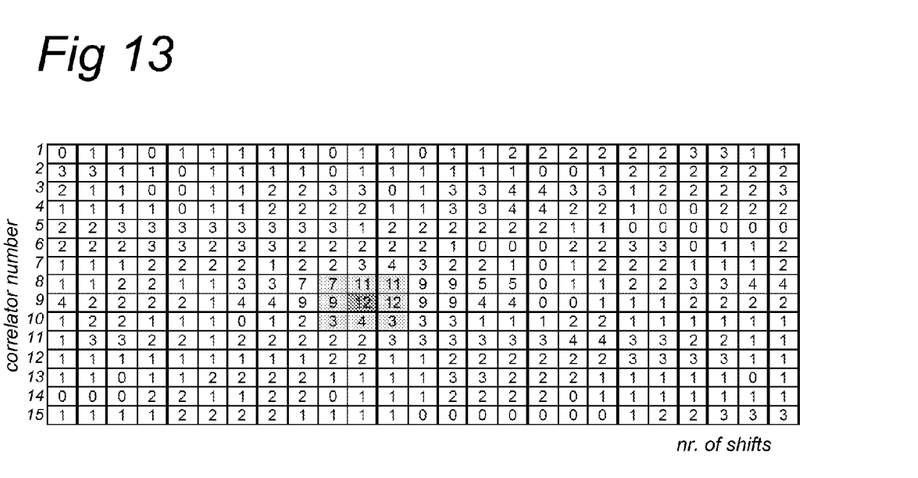
FIG. 13 illustrates an averaging window from a set of 128×15 correlator values.

In practice it turns out, that due to noise, the position of the largest magnitude, could vary over subsequent sets of correlation values. The accuracy of the position improves by averaging the values of subsequent sets. Evaluation showed that this improvement is relevant for the overall performance of a receiver. Hence, the values of correlation results adjacent the position having the 'largest magnitude' value (which means in time and frequency), are also averaged. Now a window of positions is defined, which corresponding correlation values are selected from the set of correlation value. After averaging over three results (=symbol intervals), it is determined whether the maximum of the averaged values exceeds a predetermined preamble detect threshold. The index corresponding to the maximum value indicates the timing offset and the frequency offset. FIG. 13 illustrates an averaging window applied on a set of 128×15 correlator values. The window has the size of 3×3 correlation values and is centered at the position in the set of correlation values selected to have the best correlation value. The above method of averaging uses 9 correlation values from each set for each position corresponding to the largest magnitude found and it tracks the correlation values for the window in question during successive symbol intervals. In a two antennae system, there are 2×3 of these averaging processes running in parallel, 3 for each antenna. When the averaging processing uses correlation values with a resolution of 6 bits, the amount of storage needed is: 9*3*2*6=324 flip flops. This method reduces the amount of flip flops (storage) needed for averaging by a factor of (11520*2)/324=71.1 with respect to the number needed to store three complete sets of 128×15 correlation values.

It should be noted that other window sizes could be used, e.g. 3×5 or 5×3. The size will depend on the analysis results from experiments.

Antenna selection is done on by comparing the correlation results of the respective antennae. The antenna that gives the highest correlation when a preamble is present, is considered to be best.

Figure 14:
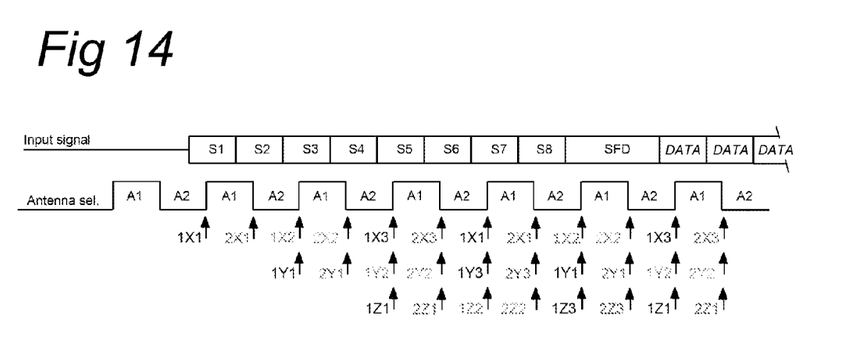
FIG. 14 illustrates the averaging process within a two antennae system.

FIG. 14 illustrates the averaging process according to the invention within a two antennae system. On top the figure shows along a time line the input signal or transmission signal. In the beginning there is no signal at all. Then, subsequently the eight preamble symbols S1-S8, two symbols forming the SFD and data symbols are received. Below the input signal timeline, a control signal or antenna select signal to switch between the two antennae is given. Below this two timelines the three parallel averaging processes for the antennae is shown.

The numbered arrows below the antenna select signal refer to the averaging processes and actual status. There are two antennae and for each antenna three correlation results are summed before comparison with the preamble detect threshold. The first number indicates whether the result is from antenna 1 or 2. X, Y and Z indicate the three different averaging processes running. And the last number indicates the number of contributions to the summation for a process so far.

For each antenna there are needed three processes and the largest magnitude found during each symbol interval leads to the start of a new averaging process. Each of the three averaging process is running for three symbol intervals and is then restarted. Further, for each antenna the result of averaging during the last three symbol intervals becomes available. The last number within say 2Y3 indicates the 'history' or status of the result. There are either 1, 2 or 3 correlation results included in the result that is provided by the averaging process. Index 1 indicates that the process is restarted and has determined a new maximum correlation value and stored the corresponding position in the set of N×P correlation values and correlation values corresponding to the averaging window. Index 2 indicates that the process has selected the correlation values from the subsequent set of N×P correlation values and added to the stored correlation values. The stored correlation values correspond in this stage to the sum of correlation values from two subsequent sets of correlation values. Index 3 indicates that that the process has selected the correlation values from the subsequent set of N×P correlation values and added to the stored correlation values. Now, the stored correlation values correspond in this stage to the sum of correlation values from three subsequent sets of correlation values. FIG. 11 shows by means of the lines Sum1, Sum2 and Sum3 the three parallel averaging processes X, Y and Z for one antenna in FIG. 14. The number next to a bar indicates the status of a process and the height of a bar the total of the sum of one, two or three subsequent correlation values.

It should be noted that a correlation result becomes available one symbol interval after the antenna slot has been ended. This relates to the way the correlation processing has been executed. At first, a shift register has to be loaded with samples from an antenna signal and then during the next symbol interval the contents of the shift register is cyclically shifted and the generated set of correlation results is evaluated. Accordingly, 1X1 refers to the first averaging process for the first antenna derived from the preceding antenna 1 slot.

The preamble signal arrives in the middle of an antenna slot for antenna 2. Lets assume this results in an inappropriate correlation peak as in this interval the preamble signal is only present during a fraction of the time. Lets also assume the SNR on antenna 1 is poor and no preamble detection will be possible with antenna 1. Then, the averaging sequence will result in preamble detection on a sequence of sets of correlation results that is starting with 2Y1. In this case, a preamble is detected at 2Y3.

However, the receiver does not know when the first symbol of preamble signal has arrived. Therefore, the receiver does not know that three preamble symbols were already included in the correlation result of 1Y3. In order to be able to determine which of the antennae gives the largest magnitude result, one extra symbol interval is needed and the correlation results of 2Y3 and 1Z3 can be compared. However, this would be too late. Then, the SFD has been started already and the packet should be received correctly.

Therefore, if 2Y3 results in preamble detection, it is assumed that 3 correlation results corresponding to three symbol intervals in the sequence of eight preamble symbols have been used. Thus, if there are 3 valid correlation results used in 2Y3, there must be at least two sets of correlation results from symbol intervals available for the first antenna. These two results are used to generate the sum value present in 1Z2. Similarly, two results are, but now from the last two symbol intervals from the first antenna, to generate the sum value present in 2Z2. Comparison of the sum correlation values from 1Z2 and 2Z2 will show which of the two antennae gives the largest magnitude. When 2Z2 is larger than 1Z2, the frequency and time indices of 2Y3 will be used. In an embodiment of the selection algorithm, if 1Z2 is larger, the indices of 1Z2 will be used to estimate the timing offset and frequency offset.

In another embodiment, if 1Z2 is larger, the preamble detection is discarded and the averaging process will proceed. If 1Z2 is larger than 2Z2, this is an indication that antenna 1 will provide a signal with a better quality. In that case antenna 1 should be able to provide three subsequent symbol intervals comprising a part of the preamble and to generate a preamble detection. Now the estimated frequency and timing offset estimation are based on three subsequent correlation results which will be more accurately.

With receive conditions having a good SNR, the new training scheme has a packet error rate (PER) in the order of 0.03% or better. This number is low enough to be no problem in terms of system throughput, but it could be improved.

The errors are caused by preamble detection on a sequence that contains at least some of the actual preamble, but as much as two of the three symbol intervals can comprise a noise signal that results in a high correlation value exceeding a predetermined threshold. Only the first of symbol interval needs to result in a timing and frequency index that is close to the real index of the last symbol intervals comprising a part of the preamble sequence.

The probability that two symbol intervals with noise prior to a symbol interval with a part of the preamble sequence have a maximum correlation value at a position in the N×P matrix of correlation values corresponding to the actual timing offset and frequency offset of the part of preamble sequence in the last symbol interval is very small. So, the probability of false detection can be reduced further by requiring that the indices of the three correlation results derived from the three symbol intervals on which a preamble is detected, are close to each other.

The preamble detection algorithm can be improved by putting additional requirements on the frequency and time indexes during the averaging period. If a preamble is detected on a succession of three preamble symbols, the index should be close to each other. Noise can cause some variation.

It turns out that these additional requirements give a considerable improvement in the irreducible error rate. FIG. 14 will be used to illustrate the use of these additional requirements.

Lets assume that the sequence of sets of N×P correlation values, resulting in a preamble detection, starts at 2X1. Apart from comparing the result, at 2X3 with the detection threshold, it is also required that the indices found at 2X1, 2Y1 and 2Z1 are close to each other. Close, since noise will make them vary a bit, also on preamble signal. So, the indices found at the three symbols that contribute to preamble detection, must be at roughly the same position in the matrix of N×P correlation values, wherein the position provides a timing offset and frequency offset estimation.

In practice, the indices are allowed to have a variation of +/−1 position in correlator number and a variation of +/−3 in number of cyclic shifts.

With the above method, the PER with an SNR of 10 dB is in the order of 0.01%.

In yet another embodiment only the indices of the averaging over the last two symbol intervals (of one antenna) will be used. Sometimes an averaging sequence is started on noise with indices close to those that are aligned with the actual preamble. In such a case the threshold can be passed, with an index that can still be too far of. With the index requirements on the detection, two noise contributions, i.e. maximum correlation value only due to noise, in a sequence that passes the threshold are extremely unlikely.

Again with reference to FIG. 14, 2X1 is assumed to be the start of the sequence resulting in a preamble detection at 2X3. Then, the magnitude of the added correlation results at 2Y2 and 1Y2 are compared for antenna selection, and the indices of the largest must be used as a symbol timing and frequency offset estimate. Simulation shows that the above method improves the PER with an SNR of 10 dB to approximately 0.0025%.

Several embodiments of the present invention have been described above by way of exemplary embodiments. Various modifications and variations for the elements described with respect to these embodiments may be made by the skilled person without departing from the scope of the present invention, which is defined by the appended claims.

The invention claimed is:

1. Arrangement for determining a characteristic from an input signal, the input signal comprising the IF frequency $f_{IF}$ and a preamble signal being a sequence of M similar data symbols, the data symbols having a symbol period SP, M being an integer greater than or equal to 2, the arrangement comprising:
   an input terminal for receiving N subsequent samples of the input signal, the N subsequent samples representing a part of the input signal approximating the symbol period SP,
   a rotation unit for cyclically shifting the N subsequent samples to obtain N rotated symbols;
   a correlation unit for correlating the N rotated symbols with P correlation functions to generate a set of N×P correlation values, each correlation function having a different centre frequency and P being an integer greater than or equal to 2; and,
   a processing unit for selecting a maximum correlation value from the set of N×P correlation values and determining the characteristic, wherein the characteristic is at least one selected from a group comprising preamble detect, frequency offset and timing offset.

2. Arrangement according to claim 1, wherein the processing unit is arranged to estimate from Q subsequent sets of N×P correlation values the frequency offset and timing offset, Q being an integer greater than 2 and smaller than M.

3. Arrangement according to claim 2, wherein the processing unit is arranged to generate a preamble detection signal when the sum of the maximum correlation value from Q subsequent sets of N×P correlation values exceeds a predefined preamble detect threshold and the variance between frequency offsets and timing offsets estimated from said Q subsequent sets of N×P correlation values is within predefined limits, Q being an integer greater than 2 and smaller than M.

4. Arrangement according to claim 1, wherein the processing unit is arranged to generate a preamble detection signal when the maximum correlation value exceeds a predefined preamble detect threshold.

5. Arrangement according to claim 1, wherein the rotation unit comprises:
   a first multiplexer having a first input coupled to an input of the rotation unit, a second input and an output;
   a first shift register comprising N delay elements, the first shift register having an input coupled to the output of the first multiplexer, a serial output coupled to the second input of the first multiplexer and a parallel output;
   a second multiplexer having a first input coupled to an input of the rotation unit, a second input and an output;

a second shift register comprising N delay elements, the second shift register having an input coupled to the output of the second multiplexer, a serial output and a parallel output;
an inverter having an input coupled to the serial output of the second shift register and an output coupled to the second input of the second multiplexer;
a first output coupled to the parallel output of the first shift register; and
a second output coupled to the parallel output of the second shift register; and wherein the correlation unit comprises a first input coupled to the first output of the rotation unit and a second input coupled to the second output of the rotation unit, the rotation unit further comprises two types of correlators, a first type of correlators having a centre frequency for which holds:

$$f_c = f_{IF} \pm \frac{X}{SP}$$

and a second type of correlators having a centre frequency for which holds:

$$f_c = f_{IF} \pm \frac{X + 1/2}{SP}$$

wherein
$f_c$=centre frequency of correlator,
$f_{IF}$=IF frequency,
SP=symbol period and
X=an integer greater than or equal to 0,
wherein an input of the first type of correlators is coupled to the first input and an input of the second type of correlators is coupled to the second input.

6. Arrangement according to claim 1, wherein the similar data symbols are pseudo-random binary value sequences wherein each binary value sequence element corresponds to a duration that is approximately equal to a cycle of the IF-frequency.

7. Arrangement according to claim 6, wherein N=128 and $f_{IF}$=2 MHz.

8. Arrangement according to claim 1 wherein the similar identical data symbols are PN pseudo-random chip binary value sequences wherein the chip rate approximates each binary value sequence element corresponds to a duration that is approximately equal to ¼ cycle of the IF frequency.

9. Arrangement according to claim 1 wherein the input signal is a binary signal.

10. Receiver for determining a characteristic for antenna signals having a carrier frequency and carrying a preamble signal being a sequence of M similar data symbols, the data symbols having a symbol period SP, M being an integer greater than or equal to 2, the receiver comprising:
a first and second input terminals for retrieving a first and second antenna signals respectively;
a first multiplexer having a first and second input coupled to the first and second input terminal respectively, and a control signal input for retrieving a control signal, the multiplexer being arranged for selecting the first and second antenna signals one by one under control of the control signal so as to obtain a combined antenna signal;
a radio unit for converting the combined antenna signal into a digital IF signal having a sample frequency $f_{SF}$;
a first rotation unit having an input, a control signal input and an output, the input being arranged for receiving N subsequent samples of the input signal under control of the control signal, the N subsequent samples representing a part of the input signal approximating the symbol period SP, the first rotation unit being arranged for cyclically shifting the N subsequent samples to generate N rotated output signals;
a second rotation unit having an input, a control signal input and an output, the input being arranged for receiving N subsequent samples of the input signal under control of the control signal, the N subsequent samples representing a part of the input signal approximating the symbol period SP, the second rotation unit being arranged for cyclically shifting the N subsequent samples to generate N rotated output signals;
a control signal generator unit for generating a control signal which enables the multiplexer to select alternating for a period which approximates the symbol period SP the first and second antenna signal, the first rotation unit to receive from the digital IF each signal part related to the first antenna signal and the second rotation unit to receive from the digital IF each signal part related to the second antenna signal;
a correlation unit for correlating the N rotated output signals generated by the first and second rotation unit with P correlation functions to generate a first and second set of N×P correlation values, each correlation function having a different centre frequency and P being an integer greater than or equal to 2; and,
a processing unit for determining from the first and second set of N×P correlation values the characteristic for each of the antenna signals, wherein the characteristic is at least one selected from a group comprising preamble detect, frequency offsets and timing offsets.

11. Receiver according to claim 10, wherein the processing unit is arranged to estimate from more than one first and second sets of N×P correlation values, the antenna providing the signal having the best signal quality.

12. Receiver according to claim 11, wherein the processing unit is arranged to generate a preamble detection signal when the sum of the maximum correlation values from Q subsequent first or second sets of N×P correlation values exceeds a predefined preamble detect threshold and the variance between frequency offsets and timing offsets estimated from said Q subsequent sets of N×P correlation values is within predefined limits, Q being an integer greater than 2 and smaller than M.

13. Receiver according to claim 12, wherein the processing unit is further arranged to select the antenna providing the signal having the best quality from at least the last two subsequent first and second sets of N×P correlation values.

14. Receiver according to claim 13, wherein the processing unit is further arranged to estimate the frequency offset and timing offset corresponding to the selected antenna from a matrix derived from the at least two subsequent sets of N×P correlation values related to the selected antenna.

15. Method of determining a characteristic from an input signal, the input signal comprising an IF frequency $f_{IF}$ and a preamble signal being a sequence of M similar data symbols, the data symbols having a symbol period SP, M being an integer greater than or equal to 2, the method comprising:
receiving N subsequent samples of the input signal, the N subsequent samples representing a part of the input signal approximating the symbol period SP,
cyclically shifting the N subsequent samples to obtain N rotated symbols;

correlating the N rotated symbols with P correlation functions to generate a set of N×P correlation values, P being an integer greater than or equal to 2; and, selecting a maximum correlation value from the set of N×P correlation values and determining the characteristic, wherein the characteristic is at least one selected from a group comprising preamble detect, frequency offset and timing offset.

* * * * *